Figure 1:
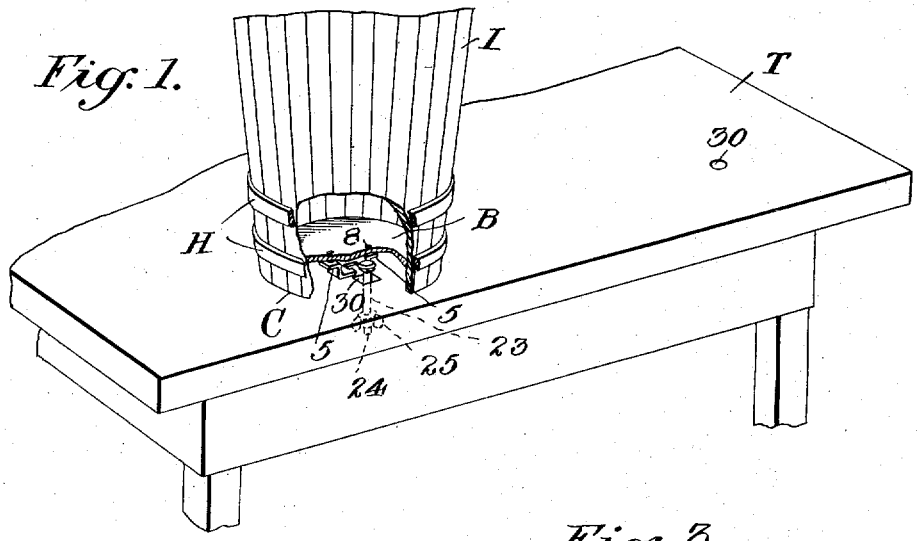

E. PRAEGER.

HOLDER FOR ICE CREAM FREEZERS.

APPLICATION FILED SEPT. 15, 1911.

Reissued Nov. 2, 1915.

14,006.

Witnesses

Jos. Holliday

B. S. Bridges

Inventor

Edward Praeger

By Davis & Davis

Attorneys

COLUMBIA PLANOGRAPH CO., WASHINGTON, D. C

UNITED STATES PATENT OFFICE.

EWALD PRAEGER, OF SAN ANTONIO, TEXAS, ASSIGNOR TO RICHMOND CEDAR WORKS, OF RICHMOND, VIRGINIA, A CORPORATION OF VIRGINIA.

HOLDER FOR ICE-CREAM FREEZERS.

14,006. Specification of Reissued Letters Patent. Reissued Nov. 2, 1915.

Original No. 996,137, dated June 27, 1911, Serial No. 613,109. Application for reissue filed September 15, 1911. Serial No. 649,577.

*To all whom it may concern:*

Be it known that I, EWALD PRAEGER, a citizen of the United States, residing at San Antonio, in the county of Bexar and State of Texas, have invented a new and useful Holder for Ice-Cream Freezers, of which the following is a specification.

This invention relates to refrigeration, and more especially to ice cream freezers; and the object of the same is to produce an improved attachment thereto for holding the body of the freezer upon a suitable support such as a table top. This object I accomplish by the construction of holder hereinafter more fully described and claimed, and as shown in the drawings, wherein—

Figure 3:
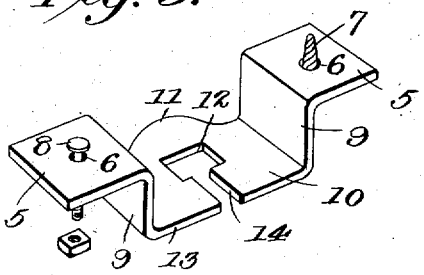
Figure 2:
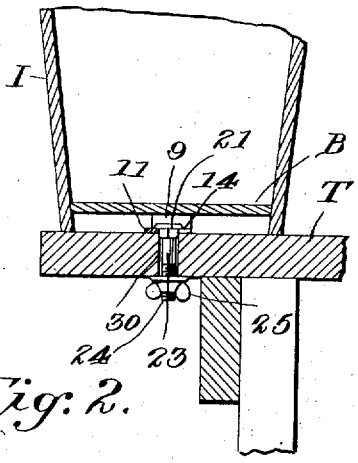
Figure 4:
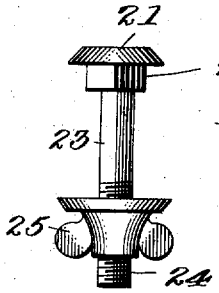

Figure 1 is a perspective view of a table and of the body of an ice cream freezer standing thereon and partly broken away to show my improved holder in place; Fig. 2 is a sectional view through the same; Figs. 3 and 4 are enlarged perspective details of the members of the holder itself.

In the drawings the letter T designates a table such as is ordinarily employed in the kitchen, and the letter I designates the body of an ice cream freezer in the present instance, the same being made up of staves projecting at their lower ends below the bottom B to form the chime, and held in place by hoops H as usual. It is well known to the house wife that in making ice cream when the same begins to stiffen it sets up considerable resistance to the rotation of the handle, and she finds it irksome to hold the body of the freezer with one hand and rotate the handle with the other, but unless she does so she is apt to over-turn the freezer and in any event the continued rotation of the handle will jiggle the freezer around upon the table top and scratch it and possibly cause the freezer to fall off. I might here state that to an extent the same difficulty is often experienced with other machines such as small churns or mixing or agitating machines of many varieties, but my present attachment is intended more particularly to bodies whose bottoms are raised as by the presence of a surrounding chime.

Coming now more particularly to the details of the present invention, the same is made in two metallic members which are preferably galvanized or otherwise treated to prevent rusting and which are so shaped and located as to be almost if not completely hidden whether in use or not, and in the case of an ice cream freezer these members can be packed within the freezer and will add but little to its expense and practically nothing to its cost of transportation. The member shown in Fig. 3 is a keeper made of strap metal (or it might be of cast iron) and comprises two extremities or ears 5 pierced with eyes or holes 6 for the passage of screws 7 or bolts 8 (both are indicated in this view); and a body between the inner ends of said ears consisting of dropped arms 9 and a flat plate 10 connecting their lower edges. In order that this member may be as small as possible, one edge of the plate 10 may be bowed outward as at 11 to accommodate a square hole 12 which extends through the plate 10 at about its center, and from this hole to the other edge 13 of the plate extends a narrow slot 14. The other member is shown in Fig. 4 and consists of a bolt and its thumb nut. The head 21 of this bolt is by preference made quite flat as shown, just beneath the head the bolt is squared as shown at 22, and the shank 23 beneath the said squared portion is round and is threaded at its lower end as shown at 24; and on this threaded portion is screwed a thumb nut 25 having rather large wings as shown. The diameter of the round shank 23 is about the same as the width of the slot 14, and the squared portion 22 is of a size to fit closely within the square hole 12. Bolts of this character are now on the market and can be purchased in large quantities and at slight expense, and the member shown in Fig. 3 can be made to correspond.

The manner of attachment and the use of this device will now be explained.

It is necessary to provide the table top T or other support with a round hole 30 (although it might be of other shape) of a size to permit the squared portion 22 of the bolt to drop therein, so that when this device is not in use the flattened head 21 of the bolt will project above the table top only for a very slight distance as will be clear. The other member is attached to the bottom B of the freezer by means of bolts 8 as shown in Figs. 1 and 3 or preferably by means of screws 7 whose tips would not pass upward through the bottom and hence would not cause any leakage of the latter; but it is essential that the arms 9 of this member shall not be of such length that the base plate 10 thereof will project below a line drawn across the lower extremity of the body I. In other words, the entire member must be of less vertical height than the depth of the chime C, by which of course it will be hidden at all times. To use the attachment, the freezer is brought into position upon the table, the thumb nut 25 loosened and run down upon the threads 24, the entire bolt lifted with one hand and held elevated until its head 21 rests against the lower face of the bottom B, and then the freezer moved with the other hand so that the slot 24 engages the shank 23, of the bolt and the latter has been caused to travel along the same until its squared portion 22 can be dropped into the square hole 12. Thereafter the thumb nut 25 is tightened up, and the obvious result is that the freezer is held firmly upon the table top so that the tendency to rock the freezer in place or to tip it over is avoided. After the machine has been used, it can be disconnected by a reversal of the operation just described.

A feature of importance is the provision of coöperating means on the bolt and the plate for locking the bolt against rotation during the act of tightening up the thumb nut. The preferred construction is that illustrated, namely, an angular device at the head of the bolt coöperating with a similarly shaped slot in the plate; with this simple device it will be impossible to rotate the bolt without also rotating the vessel, and the rotation of the vessel is practically out of the question by reason of the friction of its chime against the face of the table.

Another feature of importance is that my device is so constructed that the clamping action is directly under the center of the vessel, in which position it will have the maximum of efficiency in preventing the vessel tilting or creeping during the hard work incident to the final operation of stirring the frozen cream. This construction also takes the clamping device out of the way of the operator and in fact out of sight; and furthermore this construction enables the parts to be reduced in size and weight to a minimum. This construction also permits the vessel to be clamped to the table at such point that its chime or depending flange will engage the table top its entire length, thus contributing materially to stability.

What is claimed is:

1. The herein described holder for ice cream freezers and like machines having a raised bottom surrounded by a chime, the same comprising a metallic member consisting of two perforated ears, arms depending from their inner ends for a distance less than the height of said chime, and a plate connecting the lower ends of said arms and having a slot projecting from one edge toward the center of the plate and a square hole communicating with the inner end of said slot; and a second member consisting of a bolt adapted for insertion through a table top or other support, and having a flattened head, a squared portion just beneath the head and of a size to fit in said square hole, a reduced shank depending from said squared portion and threaded, and a thumb nut adapted to take onto said threaded end, the whole for use substantially as hereinbefore described.

2. The herein described holder for ice cream freezers and like tubs having a raised bottom surrounded by a chime, the same consisting of a horizontal plate rigidly attached to the center of the under side of the bottom of the tub and lying in a plane above the supporting edge of the chime, said plate being provided with a transverse slot or notch, and a bolt having its head provided with an angular part adapted for interlocking engagement with said slot so as to prevent the plate turning independently of the bolt, said bolt being provided with a thumb nut threaded on its lower end, for the purpose set forth.

Signed at San Antonio, Texas, this 21st day of August, 1911.

EWALD PRAEGER.

Witnesses:
F. L. Toepperwein,
Rudolf Groos.

Copies of this patent may be obtained for five cents each, by addressing the "Commissioner of Patents, Washington, D. C."